United States Patent [19]
Okai et al.

[11] Patent Number: 5,340,637
[45] Date of Patent: Aug. 23, 1994

[54] OPTICAL DEVICE DIFFRACTION GRATINGS AND A PHOTOMASK FOR USE IN THE SAME

[75] Inventors: Makoto Okai; Shinji Tsuji; Akio Ohishi; Motohisa Hirao, all of Tokyo; Hiroyoshi Matsumura, Iruma; Tatsuo Harada, Tokyo; Toshiaki Kita, Tokyo; Hideki Taira, Tokyo, all of Japan

[73] Assignee: Hitachi, Ltd., Tokyo, Japan

[21] Appl. No.: 895,430

[22] Filed: Jun. 5, 1992

Related U.S. Application Data

[63] Continuation of Ser. No. 456,083, Dec. 27, 1989, abandoned, which is a continuation of Ser. No. 94,588, Sep. 9, 1987, abandoned.

Foreign Application Priority Data

Sep. 16, 1986 [JP] Japan .................................. 61-215718

[51] Int. Cl.$^5$ .......................... B32B 3/28; G03C 5/00; G02B 27/42
[52] U.S. Cl. ................................... 428/167; 428/172; 428/212; 430/5; 430/321; 359/34; 359/290; 359/321; 359/569; 359/575
[58] Field of Search ............... 437/129, 531, 133, 173, 437/16, 19, 104, 107, 126, 935, 936, 948, 942, 51; 148/DIG. 48, DIG. 95, DIG. 72, DIG. 143, DIG. 119; 372/26, 32, 50, 45, 46, 17, 16, 96; 430/1, 2, 5, 321; 428/167, 172, 192, 212, 913; 156/625, 649, 662; 359/34, 290, 321, 569, 575

[56] References Cited

U.S. PATENT DOCUMENTS

| | | | |
|---|---|---|---|
| 3,728,117 | 4/1973 | Heidenhain et al. | 430/321 |
| 4,017,158 | 4/1977 | Booth | 430/2 |
| 4,178,604 | 12/1979 | Nakamura et al. | 437/129 |
| 4,360,586 | 11/1982 | Flanders et al. | 430/321 |
| 4,462,658 | 7/1984 | Scifres et al. | 350/96.14 |
| 4,605,606 | 8/1986 | Ferrante | 430/1 |
| 4,726,031 | 2/1988 | Wakao et al. | 372/46 |
| 4,751,707 | 6/1988 | Krebs et al. | 372/44 |
| 4,792,197 | 12/1988 | Inoue et al. | 350/162.2 |
| 4,806,442 | 2/1989 | Shirasaki et al. | 430/4 |
| 4,806,454 | 2/1989 | Yoshida et al. | 350/3.6 |

FOREIGN PATENT DOCUMENTS 0172723 9/1984 Japan .................................. 430/322

Primary Examiner—Donald J. Loney
Attorney, Agent, or Firm—Antonelli, Terry, Stout & Kraus

[57] ABSTRACT

A method of fabricating diffraction gratings wherein a photomask is arranged on a substrate which is coated with a photoresist, light is to be incident thereupon at an acute angle relative to the normal direction of the photomask, and a bright/dark pattern is formed on said photoresist by the interference of the transmission light that has passed through the photomask and the diffraction light. The invention further deals with a photomask used for the above method.

11 Claims, 7 Drawing Sheets

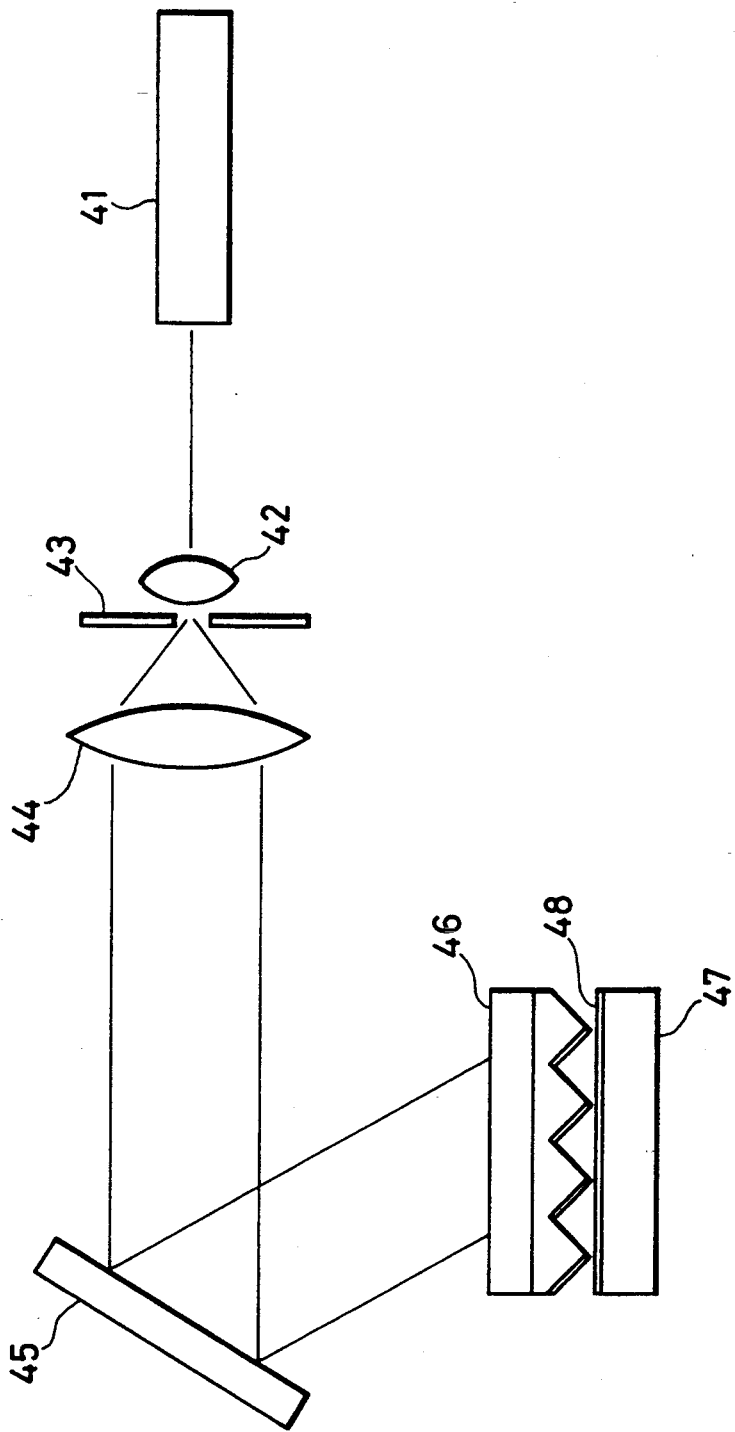

OPTICAL DEVICE DIFFRACTION GRATINGS AND A PHOTOMASK FOR USE IN THE SAME

This application is a continuation of application Ser. No. 07/456,083, filed Dec. 27, 1989, now abandoned; which is a continuation of Ser. No. 07/094,588, filed Sep. 9, 1987, now abandoned.

BACKGROUND OF THE INVENTION

I. Field of the Invention

The present invention relates to a method of fabricating diffraction gratings and a photomask for use in the same. More specifically, the invention relates to a method of fabricating diffraction gratings by the contact exposure method utilizing electromagnetic waves and, particularly, ultraviolet rays and SOR rays, the diffraction grating being suited for the production of optical elements that contain a diffraction grating therein, such as a distributed feedback (DFB) laser, a distributed Bragg reflection (DBR) laser, an optical amplifier, a spectroscope, and the like. The invention further relates to a photomask used therefor.

II. Description of the Related Art

Diffraction gratings have heretofore been fabricated by the so-called holographic exposure method according to which a laser beam is branched and is then synthesized again as disclosed, for example, in Japanese Patent Laid-Open No. 148050/1974. In particular, the diffraction grating having a uniform grating period is fabricated by the above-mentioned method.

The diffraction gratings include a diffraction grating having a uniform grating period and a λ/4-shifted grating in which the phase of diffraction grating is inverted. These gratings are fabricated by a positive and negative photoresist method based upon the holographic exposure method, or by a phase image projection method. The positive and negative photoresist method has been discussed in IEICE TECHNICAL REPORT, OQE 85-11, April, 1985, pp. 69–76, and the phase image projection method has been discussed in IEICE TECHNICAL REPORT, OQE 85-60, July, 1985, pp. 57–64.

The above related arts have problems as described below. First, with the holographic exposure method, visibility (bright/dark ratio) of fringe decreases due to mechanical vibration and sway of the air, making it difficult to obtain a diffraction grating maintaining good reproduceability. When it is desired to expand the area of exposure, in particular, the exposure must be continued for an extended period of time. Therefore, degradation of visibility becomes a serious problem. Second, it is difficult to fabricate a diffraction grating having a nonuniform grating phase, such as a phase-shifted diffraction grating in which positions of ruggedness on the grating are partly changed and a chapted diffraction grating in which the period of ruggedness is changed at a relatively short period.

With the positive and negative photoresist method, furthermore, the reproduceability is deteriorated since a mid-layer must be made present to prevent the resists from being mixed by each other. Further, with the phase image projection method which involves an interference pattern caused by multi-reflection due to phase image plates that are closely contacted to the substrate, it is difficult to obtain a diffraction grating that produces little noise.

SUMMARY OF THE INVENTION

An object of the present invention is to provide an improved method of fabricating diffraction gratings and a photomask used therefor.

Another object of the present invention is to provide a method of fabricating diffraction gratings, which is capable of easily fabricating a variety of diffraction gratings such as a diffraction grating having a uniform grating period, a phase-shifted diffraction grating, e.g., a λ/4-shifted diffraction grating in which the grating phase is shifted, and a chapted diffraction grating in which the grating period changes gradually, as well as to provide a photomask used therefor.

A further object of the present invention is to provide a method of fabricating diffraction gratings, which is capable of obtaining a variety of diffraction gratings maintaining good reproduceability, and a photomask used therefore.

In order to achieve the above and other objects, the present invention deals with a method of fabricating diffraction gratings comprising a step for arranging a photomask on a substrate which is coated over its surface with a photoresist, a step for permitting incident light to fall thereon from the upper direction at an acute angle relative to the normal direction of the photomask, and a step for forming on said photoresist a bright/dark pattern produced by the interference of transmitted light and diffracted light.

In order to achieve the above and other objects, furthermore, the present invention deals with a photomask which has a periodical waveform on the surface thereof.

With said and other objects in view, the invention consists in the methods and the construction hereinafter fully described, illustrated in the accompanying drawings, and set forth in the claims hereto appended, it being understood that various changes in the operation, form, proportion and minor details of construction, within the scope of the claims, may be resorted to without departing from the spirit of the invention or sacrificing any of the advantages thereof.

BRIEF DESCRIPTION OF THE DRAWINGS

FIG. 4 is a diagram for explaining the method of fabricating diffraction gratings according to the present invention;

DETAILED DESCRIPTION OF THE PREFERRED EMBODIMENTS

Figure 1:
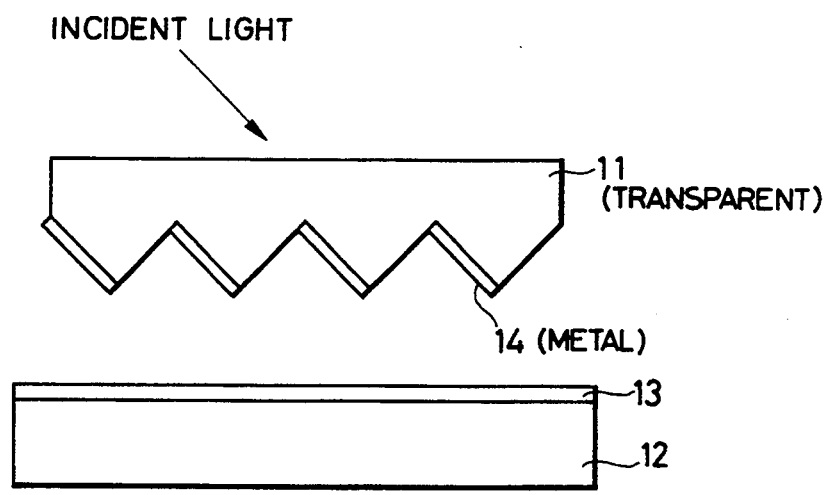
FIG. 1 is a section view of a photomask and a substrate according to the present invention as viewed from a direction perpendicular to the direction of the diffraction grating.

FIG. 1 is a diagram which illustrates the principle of a method of fabricating diffraction gratings according to the present invention.

In this method (hereinafter referred to as "contact exposure method"), a diffraction grating pattern of a photomask 11 is projected onto a resist film 13 on a sample substrate 12. Therefore, if the photomask 11 and the sample substrate 12 are fixed, position of a periodic pattern is very little affected by the sway of position of the source of light and by the sway of the air, and whereby the pattern is transferred maintaining good reproduceability. Further, even when the pattern has a short size and has a period which is as short as about the wavelength of light, the bright/ dark pattern can be transferred onto a material to which the pattern is to be transferred provided the distance between the photomask and the material lies within a range that is comparable to the coherent length of light.

When the bright/dark ratio (intensity ratio) of light (electromagnetic waves) passing through the photomask is small, however, it is difficult to transfer the pattern. In such a case, therefore, the photomask must be optimized. The optimization is accomplished by introducing ruggedness onto the surface of the photomask so that the photomask will have locally different transmission factors.

According to the contact exposure method of the present invention, diffraction gratings can be stably fabricated maintaining good reproduceability using a simple apparatus without being affected by sway caused by mechanical vibration or convection of the atmosphere, provided relative positions of the photomask and the substrate are fixed.

Figure 2:
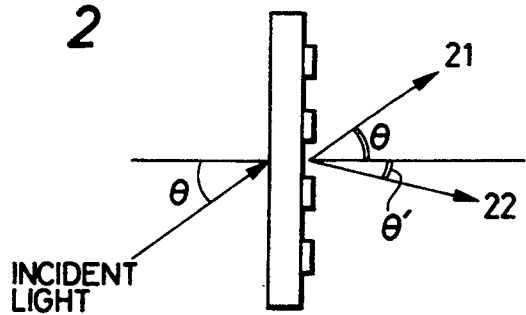
FIG. 2 is a schematic diagram illustrating a diffracted wave by the photomask according to the present invention.

When the diffraction grating has a small pattern size and its period $\Lambda$ is nearly equal to the wavelength, it becomes necessary to give attention to the diffraction phenomenon. FIG. 2 illustrates the principle of pattern transfer by diffraction according to the present invention. That is, when the electromagnetic waves having a wavelength $\lambda$ are incident upon the diffraction grating at an angle of incidence of $\theta$, diffraction waves of $\theta'$ come out that satisfy, $$k \sin \theta' = k \sin \theta + mK$$

where, $k = 2\pi/\lambda$, $K = 2\pi/\Lambda$, $m = 0, \pm 1, \pm 2,$

The feature of the present invention is to utilize a bright/dark pattern generated by the interference of transmission waves ($m=0$) and diffraction waves ($m \neq 0$) among these outgoing waves.

Among the higher order diffraction waves, the first order diffraction wave has a strength greater than those of other higher order diffraction waves. It is therefore desirable to utilize the interference between the first order diffraction wave and the transmission waves. If $\lambda$ or $\Lambda$ is selected so as to satisfy a relationship $\lambda/2 < \Lambda < \lambda$, there appear, as diffraction waves, a diffraction wave (transmission wave) 21 of the order of $m=0$ and the first order diffraction wave 22 of $m=+1$ or $-1$. The periodic pattern of photomask is projected as an interference fringe of the transmission wave and the first order diffraction wave.

Figure 3:
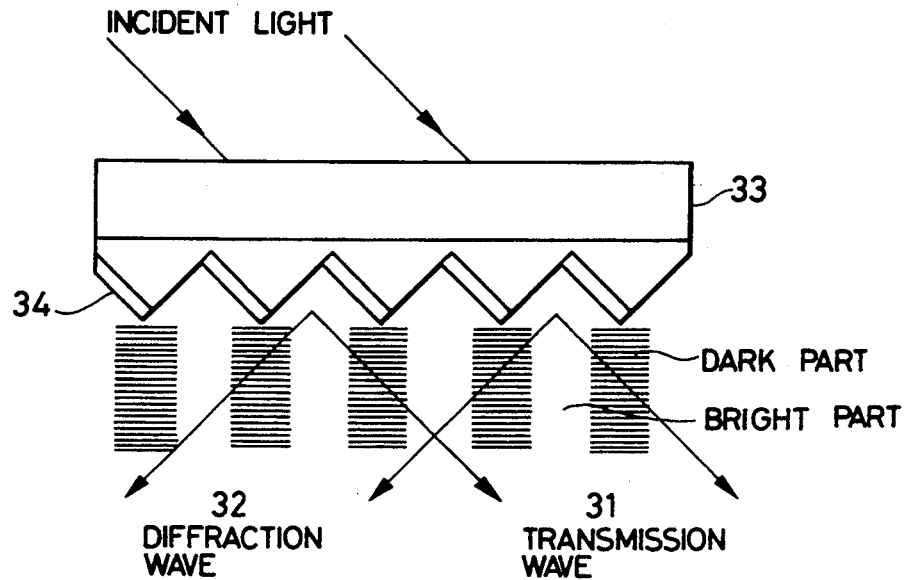
FIG. 3 is a diagram showing a bright/dark pattern formed on the lower side of the photomask in the method of fabricating a diffraction grating according to the present invention.

FIG. 3 shows the bright/dark pattern. In this case, the transmission wave 31 and the first order diffraction wave 32 interfere with each other to make fringes under the photomask 33, which periodicity is just the same as that of grating. The visibility of fringes is determined by the intensity ratio of these two waves.

The bright/dark ratio of interference fringe becomes a maximum when the intensity ratio of these diffraction waves becomes 1. At the same time, each of the diffraction waves should have a large intensity. With a photomask in which a pattern is formed on a flat substrate, the first order diffraction wave has a weak selectivity and the intensity is small, though the intensity of the diffraction wave changes little relative to the change in the angle of incidence. On the other hand, as the diffraction grating becomes rugged and gets an increased thickness, the diffraction wave exhibits increased selectivity, and the first order diffraction intensity increases near Bragg's condition. The intensity ratio of the zero order diffraction wave to the first order diffraction wave can be controlled by controlling the local transmission factor of the photomask for every period. This can be easily controlled by vaporizing a transmission factor control film 34 such as a metal film aslantly on the portions of the rugged surface.

FIG. 4 concretely illustrates the method of fabricating diffraction gratings according to the present invention.

In order to fabricate a diffraction grating having a period of from 0.1 μm to 0.6 μm by the contact exposure method, use is made of a source of light 41 having a high coherency such as an He-Cd laser (an oscillation wavelength of 325 nm), the laser beam is expanded through a lens 42 and a pinhole 43, and then a parallel beam is obtained through a lens 44. The beam is then reflected by a mirror 45 and is permitted to fall on a photomask 46 from a tilted direction. The angle of incidence is set to be $\theta$ with respect to the normal of the photomask 46 on a plane of the photomask 46 perpendicular to the direction of the diffraction grating, and the diffraction grating pattern is projected in a direction vertical to the photomask 46 by utilizing the interference of the transmission light and the first order diffraction light. In this case, the bright/dark ratio of a project pattern of the diffraction grating becomes the greatest when the intensity ratio of the transmission light and the first order diffraction light is 1 to 1. Therefore, the light should be incident near a Bragg angle $\theta_B$ at which the first order diffraction light becomes intense. In the case of a sine wave phase type grating, the Bragg angle $\theta_B$ is given by, $$\theta_B = \sin^{-1}(\lambda/2\Lambda)$$

where $\lambda$ denotes an oscillation wavelength of the laser used as a source of light, and $\Lambda$ denotes a period of the diffraction grating.

Here, the surface of the substrate 47 and the surface of the photomask 46 are usually warped and are rugged, and are not perfectly contacted to each other. If there exist gaps of a distance several times as great as the wavelength, there develop an interference pattern due to multi-reflection between the photomask 46 and the substrate 47. When the bright/dark ratio of the interference pattern is comparable with the bright/dark ratio of the diffraction grating project pattern, the two patterns are superposed and are projected onto the photoresist 48. The interference pattern caused by the multi-reflection can be removed by expanding the gap between the photomask 46 and the substrate 47. It has been discovered that the bright/dark ratio of the diffraction grating project pattern does not deteriorate when the gap ranges from 0 to 300 μm.

In the embodiments that will be mentioned below, a gap of 50 to 250 μm is maintained during the exposure to obtain particularly good results.

After the exposure, the photoresist is developed. Then, using the photoresist as a mask, the ordinary wet etching is effected to fabricate a diffraction grating on the surface of the substrate.

The same also holds true even when a SOR device is used as a source of light to form a fine grating pattern on the substrate. The photomask will be composed of a quartz glass, boron nitride, or the like.

The invention will now be concretely described by way of embodiments.

Embodiment 1

Figure 5A:
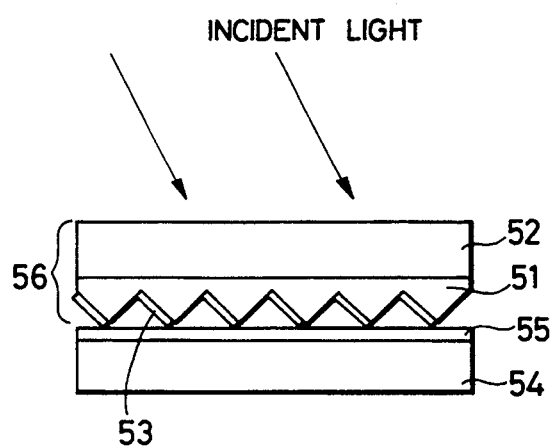
FIGS. 5(a), 5(b) and 5(c) are diagrams illustrating the method of fabricating diffraction gratings using the photomask according to the present invention.
Figure 5B:
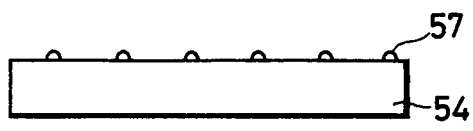
Figure 5C:

The invention will now be described in conjunction with FIGS. 5(a), 5(b) and 5(c). A replica of a rugged type diffraction grating having a period of 150 to 500 nm fabricated by a ruling machine was formed on a glass plate 52 using an epoxy resin 51. Then, a metal 53 such as aluminum, chromium, copper or gold was vaporized from a tilted direction to form a transmission factor control film (designated at 14 in FIG. 1), in order to fabricate a pattern in which the metal was vaporized on the tilted surfaces of one side only of the diffraction grating. The transmission factor control film needs not necessarily be limited to the above-mentioned metals only but may be composed of, for example, an organic material, as a matter of course, provided it blocks the electromagnetic waves to some extent. The contact exposure method was carried out using the thus fabricated amplitude and phase type photomask. The surface of an InP substrate 54 was coated with a photoresist 55 maintaining a thickness of 50 to 200 nm. An He-Cd laser (oscillation wavelength, 325 nm) was used as a source of light, and the light was permitted to be incident from a tilted direction so that the intensity ratio of the transmission wave which had passed through the photomask 56 to the first order diffraction wave approached 1:1. Here, the image was blurred very little when the gap was 0 to 300 μm between the photomask 56 and the InP substrate 54. In order to protect the mask and to remove Newton ring that developed between the photomask 56 and the InP substrate 54, therefore, the exposure was effected by providing a gap of 50 to 250 μm. After the exposure, the photoresist 55 was developed to fabricate a diffraction grating pattern 57 (FIG. 5(b)) of photoresist 55. Using the diffraction grating pattern 57 of photoresist as a mask, a diffraction grating was fabricated on the surface of the InP substrate 54 (FIG. 5(c)) by selective etching. The thus fabricated diffraction grating had the shape and diffraction efficiency comparable to those of the diffraction gratings fabricated by the ordinary holographic exposure method, and sufficiently satisfied the requirements necessary for the diffraction grating for semiconductor lasers.

Using this diffraction grating, a DFB laser having a cavity length of 400 μm was fabricated. That is, there was obtained a semiconductor laser having a threshold current of 20 mA and good single mode characteristics.

Embodiment 2

Figure 6:
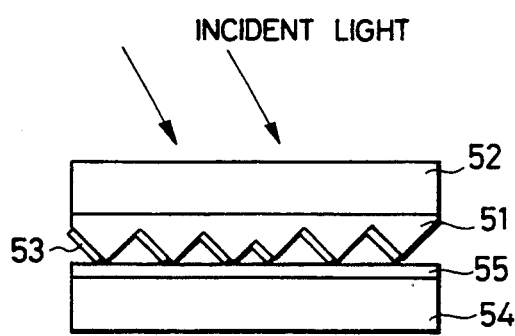
FIGS. 6, 7, 8, 9, 10, 11, 12 and 13 are section views of photomasks and substrates in a direction perpendicular to the direction of the diffraction grating according to embodiments of the present invention.

The invention will be explained in conjunction with FIG. 6. This embodiment is different from the embodiment 1 with respect to that a diffraction grating in which the phase is shifted is used as the photomask. This makes it possible to fabricate on the surface of an InP substrate a diffraction grating in which the phase is shifted.

Figure 19:
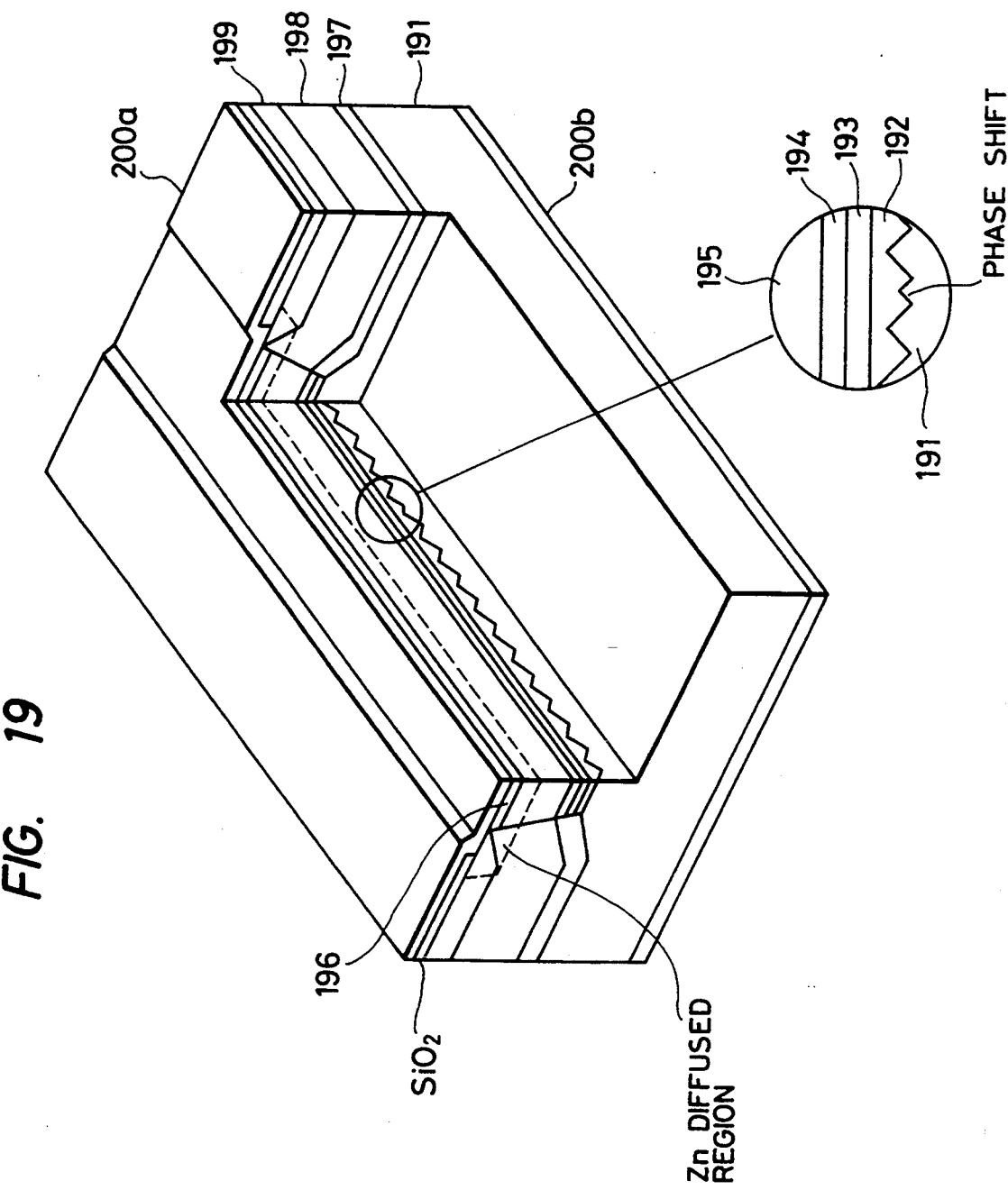
FIG. 19 illustrates an applied art obtained by using the method of fabricating diffraction gratings according to the present invention.

FIG. 19 illustrates a DFB laser which employs this diffraction grating.

On an n-type InP substrate 191 on which a λ/4-shifted grating had been formed, there were epitaxially grown an n-type InGaAsP guide layer 192, a non-doped InGaAsP active layer 193, a p-type InGaAsP buffer layer 194, a p-type InP cladding layer 195, and a p-type InGaAsP cap layer 196. After a mesa structure was formed by wet etching, there were epitaxially grown a p-type InP 197, an n-type InP 198, and a p-type InGaAsP 199, successively, thereby to form a buried layer. Zinc ions were diffused in order to obtain an ohmic contact and, then, a positive electrode 200a and a negative electrode 200b were formed by vaporization. In order to restrain the index of reflection to be smaller than 1% on both end surfaces, a non-reflection coating of a double-layer film, i.e., $SiO_2/SiN$, was applied.

Embodiment 3

Figure 7:
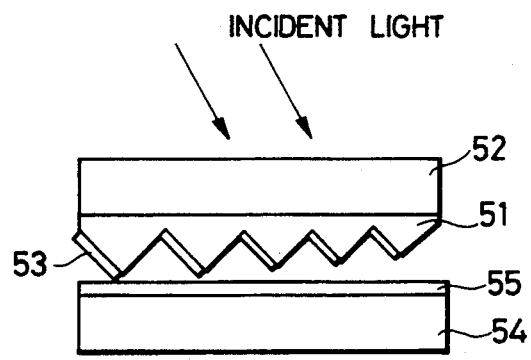

Next, the invention will be described in conjunction with FIG. 7. This embodiment is different from the embodiment 1 with respect to that a diffraction grating in which the period gradually changes is used as the photomask. This makes it possible to fabricate on the surface of an InP substrate a diffraction grating in which the period gradually changes.

Embodiment 4

Figure 8:
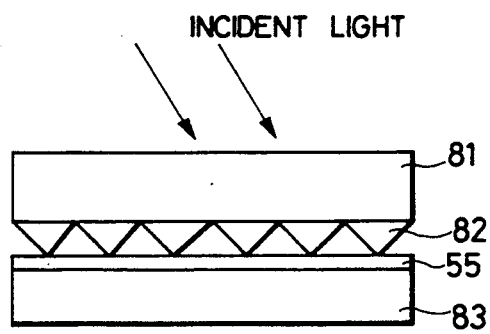

The invention will be explained with reference to FIG. 8. After a metal 82 such as aluminum or nickel was vaporized on the surface of a glass 81 maintaining a thickness of 10 to 50 nm, grooves were formed by the ruling machine to reach the surface of the glass 81. The contact exposure was carried out using the thus fabricated metallic diffraction grating 82 as the photomask. The source of light and the gap between the photomask and the InP substrate 83 were the same as those of the embodiment 1. After the exposure, the developing and transfer etching were effected to fabricate a good diffraction grating on the surface of the InP substrate 83.

Embodiment 5

Figure 9:
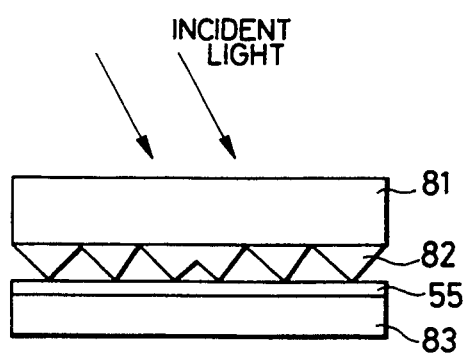

The invention will be explained in conjunction with FIG. 9. This embodiment is different from the embodiment 4 with respect to that a diffraction grating in which the phase is shifted is used as the photomask. This makes it possible to fabricate on the surface of the InP substrate a diffraction grating in which the phase is shifted.

A DFB semiconductor laser having a phase shift was fabricated using the above diffraction grating. There was obtained a laser of single mode oscillation maintaining a very high fabrication yield.

Embodiment 6

Figure 10:
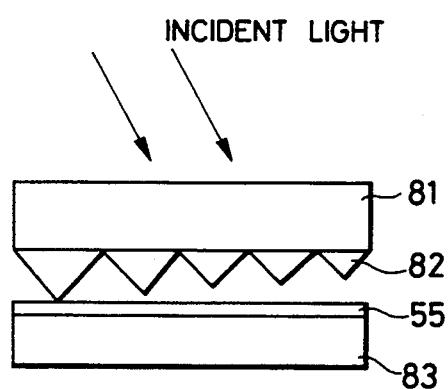

The invention will be described in conjunction with FIG. 10. This embodiment is different from the embodiment 4 with respect to that a diffraction grating in which the period gradually changes is used as the photomask. This makes it possible to fabricate on the surface of the InP substrate a diffraction grating in which the period gradually changes.

Embodiment 7

Figure 11:
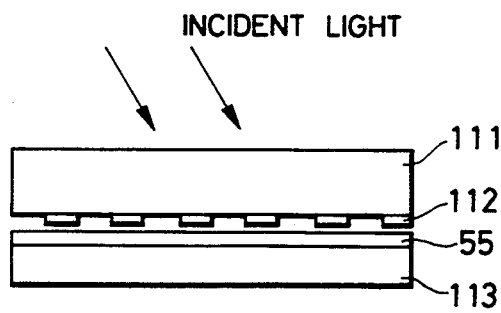
Figure 14A:
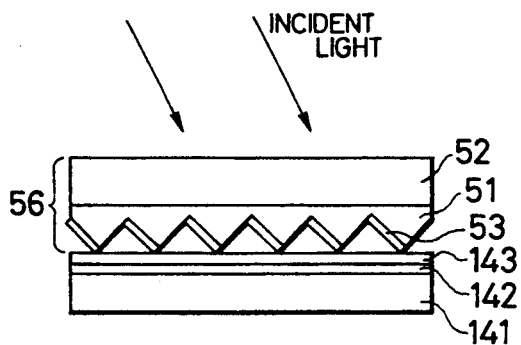
FIGS. 14(a), 14(b), and 14(c) are diagrams illustrating a method of forming a photomask according to the present invention.

The invention will now be described in conjunction with FIG. 11. A metal such as chromium or chromium oxide was vaporized on the surface of a glass 111 maintaining a thickness of 10 to 100 nm. Then, a photoresist was spin-coated thereon maintaining a thickness of 50 to 200 nm. A pattern of a diffraction grating was written using an electron beam direct wafer writing apparatus, and was developed. Then, using the diffraction grating pattern of a photoresist as the mask, the metal was removed by etching using a reactive ion etching apparatus employing a chlorine gas, in order to fabricate a pattern of the metallic diffraction grating 112. The contact exposure was carried out using the thus fabricated diffraction grating as the photomask. The source of light and the gap between the photomask and the InP substrate 113 were the same as those of the first embodiment. After the exposure, developing and transfer etching were carried out to fabricate a good diffraction grating on the surface of the InP substrate.

Embodiment 8

Figure 12:
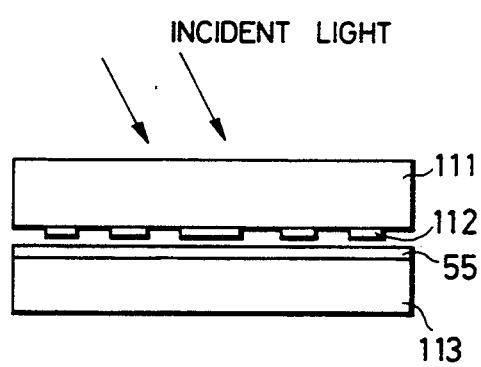

The invention will be described with reference to FIG. 12. This embodiment is different from the embodiment 7 with respect to that a diffraction grating in which the phase is shifted is used as the photomask. This makes it possible to fabricate on the surface of the InP substrate a diffraction grating in which the phase is shifted.

Embodiment 9

Figure 13:
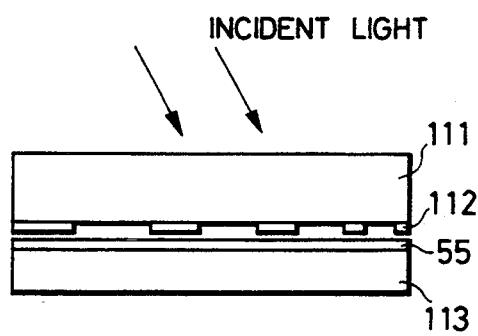

The invention will now be described with reference to FIG. 13. This embodiment is different from the embodiment 7 with respect to that a diffraction grating in which the period is gradually shifted is used as the photomask. This makes it possible to fabricate on the surface of the InP substrate a diffraction grating in which the period is gradually shifted.

Embodiment 10

The invention will now be described in conjunction with FIGS. 14(a), 14(b), 14(c) and 14(d). A metal 142 such as chromium or chromium oxide was vaporized on the surface of a glass plate 141 maintaining a thickness of 10 to 100 nm (FIG. 14(a)). Then, a photoresist 143 was spin-coated thereon maintaining a thickness of 50 to 200 nm. The same photomask 56 as the one used in the embodiment 1 was used as the first photomask to carry out the contact exposure. The source of light and the gap between the photomask 56 and the InP substrate were the same as those of the first embodiment. After developing, a diffraction grating pattern 144 of a photoresist was fabricated (FIG. 14(b)). Using the diffraction grating pattern 144 as a mask, the metal was removed by etching with a chlorine gas using a reactive ion etching apparatus, thereby to fabricate a metallic diffraction grating pattern 145 (FIG. 14(c)). Using the thus fabricated diffraction grating as a second photomask 146, the contact exposure was carried out (FIG. 14(d)). The source of light and the gap between the photomask 146 and the InP substrate 147 were the same as those of the embodiment 1. After the exposure, developing and transfer etching were carried out to fabricate a good diffraction grating on the surface of the InP substrate. Similarly, good diffraction gratings were obtained even when the photomasks used in the embodiments 2 to 9 were used as the first photomask. The DFB semiconductor laser was fabricated using the thus obtained diffraction grating, and good single-mode oscillation characteristics were obtained.

Embodiment 11

Figure 15A:
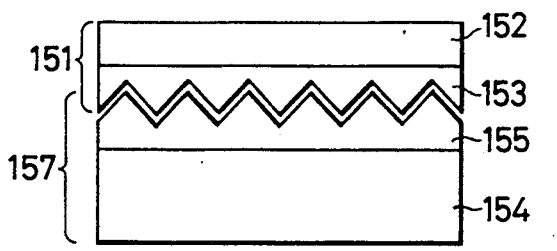
FIGS. 15(a) and 15(b), FIGS. 16, 17 and 18 are section views illustrating photomasks according to embodiments of the present invention.
Figure 14B:
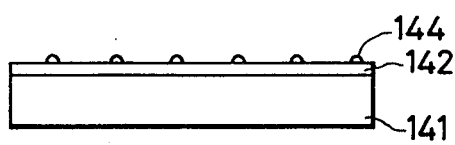
Figure 15B:
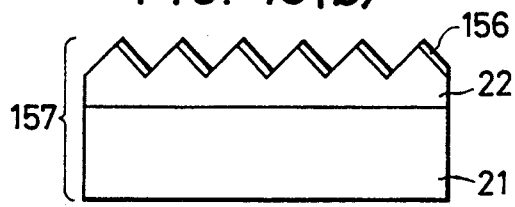
Figure 14C:
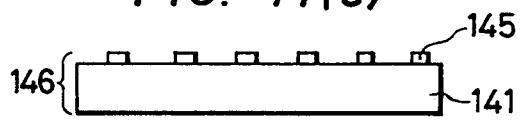

The invention will now be explained in conjunction with FIGS. 15(a), 15(b) and 1.

First, described below is a step for preparing a master 151. A metal 153 such as aluminum was vaporized on a glass substrate 152, and lines were engraved in the surface to prepare a diffraction grating, i.e., to prepare the master 151. Then, a resin 155 such as an epoxy resin or a UV-resin was applied onto a quartz glass substrate 154, and was then press-adhered onto the master 151. The resin 155 was then hardened, and ruggedness was transferred onto the surface of the resin 155 (FIG. 15(a)). Then, chromium was deposited aslantly, so that a transmission factor control film 156 was formed on the rugged surfaces of one side only, thereby to obtain a photomask 157 (FIG. 15(b)). The photomask can be fabricated by the mechanical replicating method if the resin 155 is interposed. In fabricating the masters 151, therefore, there was no problem even though the throughput was poor.

Figure 20:
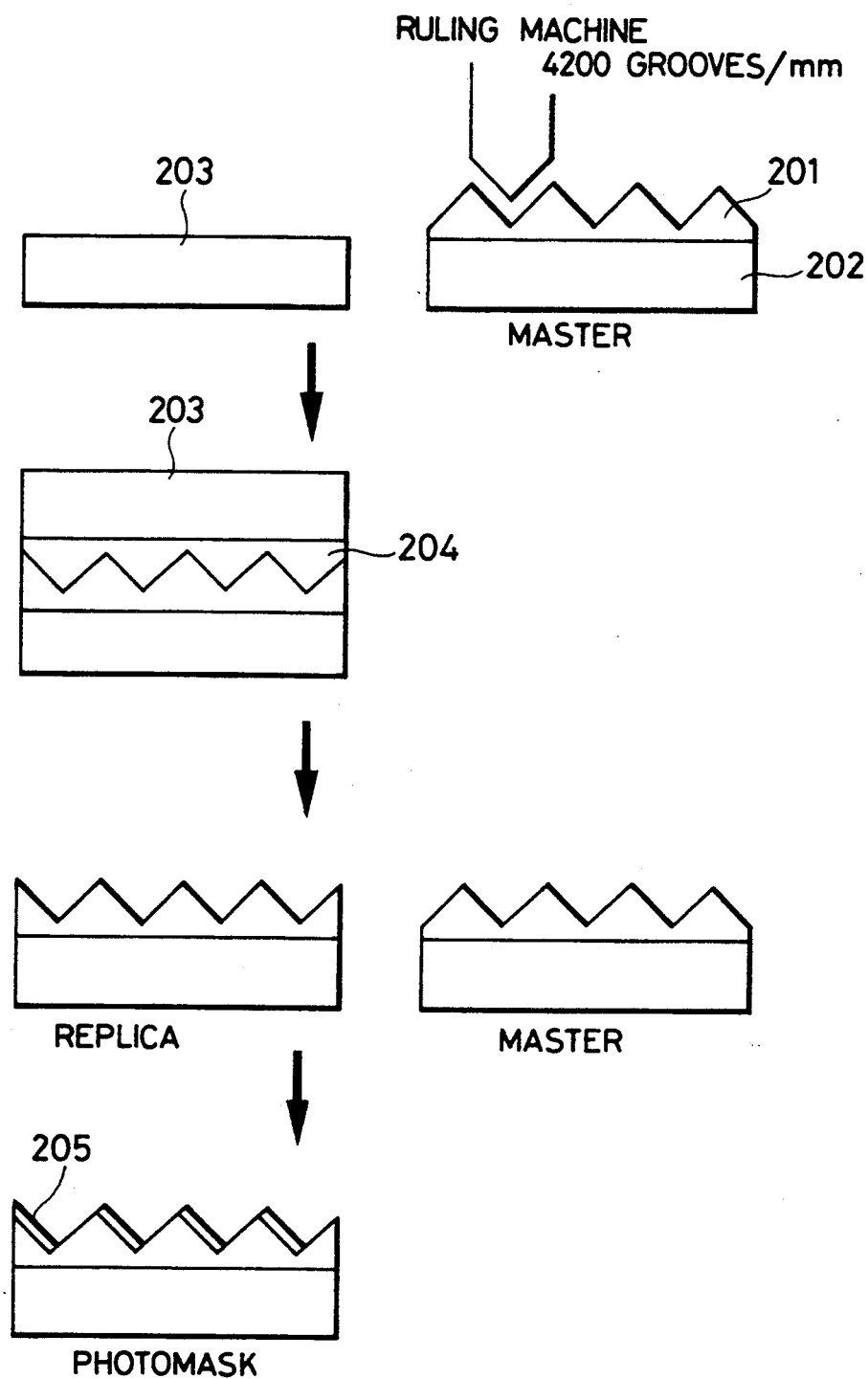
FIG. 20 is a diagram illustrating a method of forming a photomask according to the present invention.

An example of the replicating method will now be described in detail in conjunction with FIG. 20 which shows the fabrication method of grating photomask. First, a thin aluminum film 201 was deposited on a flat glass 202 and was ruled mechanically to form 4500 grooves per milimeter with phase shift. Phase arranging regions were formed to shift the phase. The phase arranging region contains six grooves whose periodicity is shorter than that of the normal region to obtain $\lambda/4$ phase shift. Thus, there was obtained the master grating with $\lambda/4$ phase shift. The phase shift was realized step by step with six groovings. This is because for the ruling machine, step by step change is easier to control the periodicity than drastic change. Next, the shape of corrugations of master grating was copied on a quartz glass 203 using a UV-resin 204 as a molding agent. This reprica grating was used as a grating photomask. In order to equalize the intensity of transmission wave and the first order diffraction wave, chrome 205 was deposited on only one side of each of the corrugation slopes. The intensity of the transmission wave decreased and that of the first order diffraction wave increased owing to chrome slits.

The step of fabricating the diffraction grating using this photomask will now be explained with reference to FIG. 1. The photomask 11 obtained as described above and a substrate 12 were arranged as shown in FIG. 1, and a diffraction grating pattern of photomask was optically transferred onto a photoresist 13 on the substrate 12. An He-Cd laser (wavelength, 325 nm) was used as a source of light for exposure, and the light was permitted to be incident at an angle of 42.6°±20°. A diffraction grating pattern having a period of 240 nm could be transferred. Using the photoresist pattern as a mask, etching was carried out to transfer the diffraction grating onto the surface of the substrate 12. The diffraction efficiency of the thus transferred diffraction grating was 5 to 10%, which was sufficient for fabricating the DFB laser.

Embodiment 12

Figure 16:

The embodiment 11 has dealt with the method of obtaining the diffraction grating having a uniform period. By changing the shape of the photomask 157, however, a modified diffraction grating can be fabricated in which the period and phase are shifted. FIG. 16 shows an embodiment in which the portions for depositing the transmission factor control film 161 are shifted by changing the direction of aslant vaporization. By transferring the pattern using the photomask 162, the diffraction grating in which the phase is shifted can be fabricated on the resist.

Embodiment 13

Figure 17:
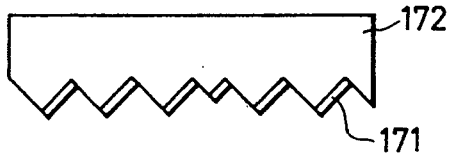
Figure 14D:
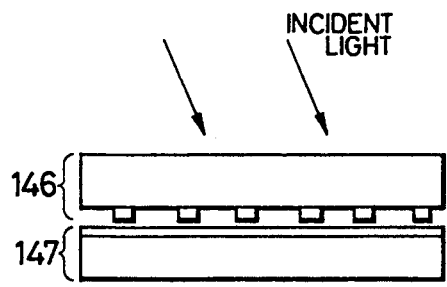
FIG. 14(d) is a section view of the substrate and the photomask.

The phase can be shifted even by changing the period of ruggedness of the photomask as shown in FIG. 17. The transmission factor control film 171 can be formed through one time of operation presenting advantage in that the pattern needs not be matched during the vaporization unlike that of the embodiment 12. When a pattern was transferred onto the photoresist using the photomask 172, a transition region from where diffraction grating had disappeared developed corresponding to the phase-shifted region. It was found that this was due to that the diffraction waves were cancelled by each other because of the effect of phase shift. The length of the transition region varied depending upon the size of gap between the photomask 172 and the photoresist. By selecting the gap to be smaller than 150 μm, the length of the transition region could be reduced to 5 μm or shorter. By burying the diffraction grating in the semiconductor laser, furthermore, there was obtained an element that stably oscillated in a single mode.

Embodiment 14

Figure 18:
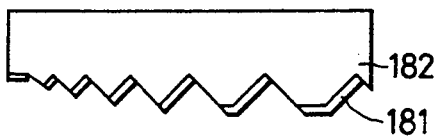

By changing the period of diffraction grating of photomask 182 as shown in FIG. 18, a chapted diffraction grating having a changing period could be transferred and could be used as a diffraction grating for a branching filter.

What is claimed is:

1. An optical device comprising:
   a first semiconductor region on which a grating comprising a plurality of grooves is formed, the grating having a first region, a second region and a phase shift region of predetermined length arranged between the first and second region, a periodicity of grooves of the phase shift region being shorter than that of grooves of the first and second region, wherein said grating is formed on said first semiconductor region by arranging a grating photomask above said first semiconductor region, said grating photomask comprising a substrate and a thin film containing grooves disposed thereon, each of said grooves having a transmission factor control film on only one side thereof, permitting light to be incident upon said photomask so as to form a bright/dark pattern by interference with light, and forming said grating on said first semiconductor region, a pattern of the grating corresponding to said bright/dark pattern;
   a second semiconductor region formed on the first semiconductor region;
   an active region formed on the second semiconductor region;
   a third semiconductor region disposed on the active region;
   a first electrode electrically connected to the first semiconductor; and
   a second electrode electrically connected to the third semiconductor.

2. The device as set forth in claim 1, wherein the grating is a λ/4-shifted grating.

3. The device as set forth in claim 1, wherein the first and the second and the active regions are etched so as to form a mesa structure.

4. The device as set forth in claim 1, wherein the third semiconductor region includes a plurality of semiconductor layers having different conductivities.

5. The device as set forth in claim 1, wherein an index of reflection on an end surface of the device is smaller than 1%.

6. The device as set forth in claim 5, wherein said index of reflection is accomplished by setting a film on said end surface.

7. The device as set forth in claim 6, wherein said film is a double-layer film.

8. The device as set forth in claim 7, wherein said double-layer film is made of $SiO_2/SiN$.

9. The device as set forth in claim 1, further including a clad region and a cap region on the active region.

10. The device as set forth in claim 1, further including a buffer region on the active region.

11. The device as set forth in claim 1, wherein the device is a DFB laser.

* * * * *